(12) United States Patent
Smith et al.

(10) Patent No.: US 6,272,824 B1
(45) Date of Patent: Aug. 14, 2001

(54) HEADER TRANSPORT LOWER REST BRACKET ASSEMBLY

(75) Inventors: David R. Smith; Michael J. Hilvers, both of Fort Jennings, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 09/366,545

(22) Filed: Aug. 4, 1999

(51) Int. Cl.$^7$ .................................................. A01B 73/00
(52) U.S. Cl. .............................. 56/228; 56/473.5; 410/77
(58) Field of Search .................... 56/228, 473.5; 410/2, 4, 45, 156, 8, 72, 77, 80; 248/674, 675, 228.2, 228.4, 309.1; 296/3; 280/789, 781, 656, 111

(56) References Cited

U.S. PATENT DOCUMENTS

| | | |
|---|---|---|
| 1,948,367 | 2/1934 | Bristol . |
| 2,158,399 | 5/1939 | Carter . |
| 3,205,977 | 9/1965 | Goldzwig et al. . |
| 3,245,695 | 4/1966 | Bernard . |
| 3,658,195 | 4/1972 | Fantin . |
| 3,921,762 | 11/1975 | Provine, III . |
| 4,184,694 | 1/1980 | Porter . |
| 4,371,299 | 2/1983 | Cain et al. . |
| 4,498,822 | 2/1985 | Diba . |
| 4,770,577 | 9/1988 | Farris . |
| 4,834,598 | 5/1989 | Bruns . |
| 5,040,825 | 8/1991 | Kuhns . |
| 5,333,904 | 8/1994 | Kuhns . |
| 5,361,569 | 11/1994 | Schupman et al. . |
| 5,374,082 | 12/1994 | Smith . |
| 5,529,447 | 6/1996 | Bruns et al. . |
| 5,785,472 | 7/1998 | Smith et al. . |
| 6,047,989 | * 2/1998 | Wood ................................ 280/789 |

FOREIGN PATENT DOCUMENTS 2629822   1/1978  (DE) .

OTHER PUBLICATIONS

May–Wes™ Manufacturing, Inc., *The Farmer's Marketplace 1995–96 Agri Products Price Book*, p. 50 (1995).

* cited by examiner

*Primary Examiner*—Thomas B. Will
*Assistant Examiner*—Árpád Fábián Kovács
(74) *Attorney, Agent, or Firm*—Rothwell, Figg, Ernst & Manbeck, P.C.

(57) ABSTRACT

A header transport lower rest bracket assembly for a header transport carriage having a frame, including a bottom bracket member capable of being movably clamped to the frame, the bottom bracket member having a pair of side plates having a correspondingly aligned working position hole located in a central region and a correspondingly aligned storage position hole located in an end region, a riser pad having an upper support surface and a riser backstop projecting from the upper support surface at an angle from vertical, and a pair of leg plates extending downwardly from the upper support surface, each of the leg plates having a correspondingly aligned substantially centrally located mounting hole and a lobe extending past the upper support surface adjacent the riser backstop, and a pin for retaining the riser pad in either a working position or a storage position, wherein the riser pad in a working position sets on the top support surface of the bottom bracket member and is held in place by the pin extending though the working holes in the bottom bracket member, and wherein the riser pad in a storage position is suspended between the bottom bracket member and the pin extending through the storage holes.

11 Claims, 5 Drawing Sheets

HEADER TRANSPORT LOWER REST BRACKET ASSEMBLY

BACKGROUND OF THE INVENTION

1. Field of the Invention

The present invention relates generally to a header transport bracket assembly.

2. Description of the Background Art

Modern grain harvesters are large and complicated pieces of machinery that are used to harvest large quantities of grains and crops of all types. Harvester size has increased over the years as farm sizes have increased, in an effort to increase farming efficiency and to reduce the man-hours needed to raise crops. Some of the many crops harvested by machine are corn, wheat, soybeans, and oats, for example.

A grain header is essentially the frontmost mechanism of the harvester, cutting the grain and feeding it into the harvester for threshing. The header size determines the swath or width of cut of the harvester, and therefore the rate at which a crop can be harvested. Headers can be disconnected and removed from the harvester for purposes of maintenance, selection of an appropriate header, or transportation, for example. The header commonly is wider than the rest of the harvester, and presents the greatest problem when transporting the harvester. Header removal therefore enables easier and safer transportation of the harvester by transporting the header independently of the rest of the machine, allowing the header-less machine to be narrower and therefore easier and safer to move by road.

Headers may be independently handled and transported by putting a header on a header transport carriage having a frame, wheels, and a hitch. Because a grain header is an expensive piece of machinery, it must be properly supported during handling and transportation. Typically, a grain header has a backbone or main tube extending along the rear of the header that carries most of its weight. In addition, corn headers (a type of grain header) commonly have legs or feet that extend below the backbone of the header. Headers may be safely transported by a header transport carriage that supports such a backbone or main tube.

There remains a need in the art for an improved header transport bracket assembly for supporting a variety of common headers.

SUMMARY OF THE INVENTION

A header transport lower rest bracket assembly for a header transport carriage having a frame is provided according to the invention. The header transport lower rest bracket assembly comprises a bottom bracket member capable of being movably clamped to the frame, the bottom bracket member having side portions and a top support surface, the top support surface having a bottom bracket backstop projecting from the top support surface at an angle from vertical, and a pair of side plates on each end of the bottom bracket member and transverse to a frame member on which the bottom bracket member is clamped, each of the side plates having a correspondingly aligned working position hole located in a central region and a correspondingly aligned storage position hole located in an end region opposite the bottom bracket backstop, a riser pad having an upper support surface, a riser backstop projecting from the upper support surface at an angle from vertical, and a pair of leg plates extending downwardly from the upper support surface, each of the leg plates having a correspondingly aligned substantially centrally located mounting hole and a lobe extending past the upper support surface adjacent the riser backstop, and a pin for retaining the riser pad in either a working position or a storage position, wherein the riser pad in a working position sets on the top support surface of the bottom bracket member with the riser backstop being positioned adjacent the bottom bracket backstop, the riser pad being held in place by the pin extending through the working position holes in the bottom bracket member and also through the mounting holes of the riser pad, and wherein the riser pad in a storage position is suspended between the pin and the bottom bracket member, with the pin residing in the storage position holes in the pair of side plates of the bottom bracket member and the riser backstop resting against the pin, with the pair of leg plates of the riser pad resting against a side portion of the bracket opposite the bottom bracket backstop.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 1:
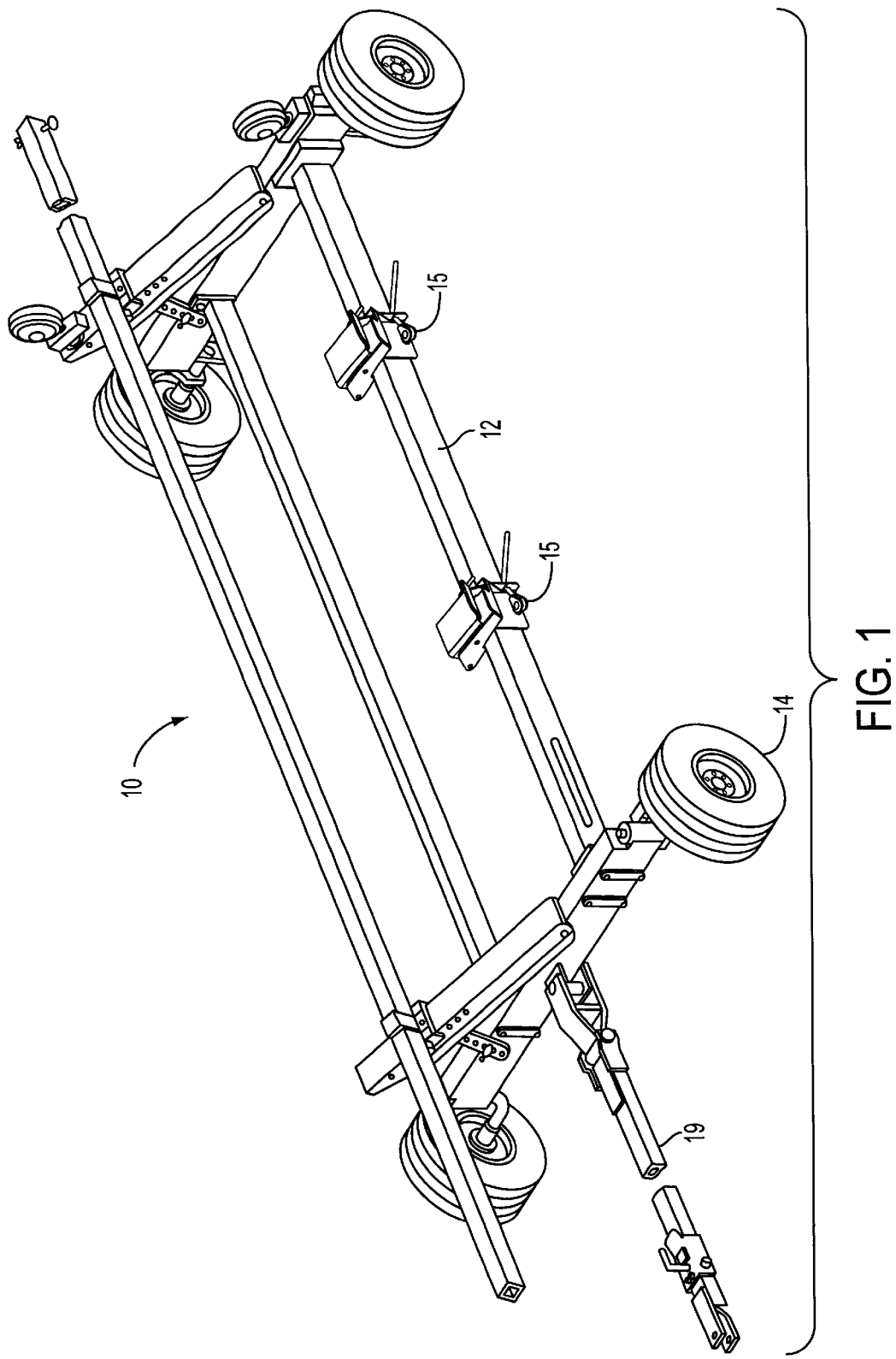
FIG. 1 shows a typical header transport carriage.

FIG. 1 shows a typical header transport carriage 10 that may be used with the header transport lower rest bracket assembly 15 of the present invention. The carriage 10 may include a frame 12, such as a tube steel frame, one or more header transport lower rest bracket assemblies 15, wheels 14, and a hitch 19. A header to be transported (not shown) may be placed on the carriage 10, with the header transport lower rest bracket assemblies 15 receiving a portion of the weight of the header and functioning to hold the header in a desired position.

Figure 2:
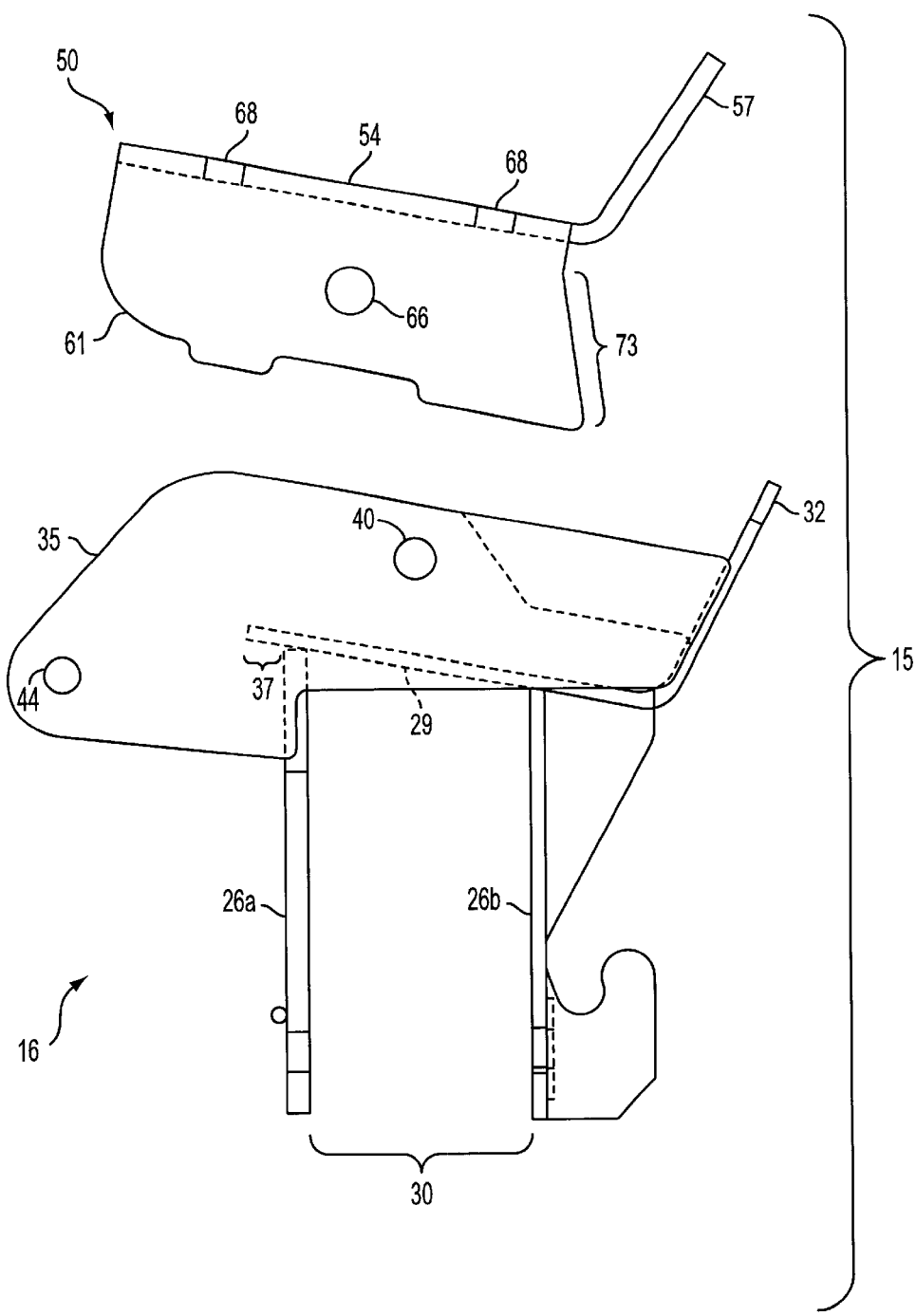
FIG. 2 shows a side view of a header transport lower rest bracket assembly.

FIG. 2 shows a side view of the header transport lower rest bracket assembly 15, with the header transport lower rest bracket assembly 15 including a bottom bracket member 16 and a riser pad 50. The bottom bracket member 16 includes side portions 26a, 26b and a top support surface 29. The side portions 26a, 26b and the top support surface 29 form an open space 30 for receiving the frame 12. The bottom bracket member 16 further includes a bottom bracket backstop 32 and a pair of side plates 35. The pair of side plates 35 include a correspondingly aligned working position hole 40 located in a central region and a correspondingly aligned storage position hole 44 located in an end region opposite the bracket backstop 32. As can be seen from the figure, the top support surface 29 slants downwardly toward the bottom bracket backstop 32, and includes an overhang 37 that extends beyond the side portion 26a. The bottom bracket backstop 32 projects from the top support surface 29 at an angle from vertical.

In use, the bottom bracket member 16 is movably clamped to the frame 12 of the carriage 10. In one embodiment, the bottom bracket member 16 is mounted as shown in U.S. Pat. No. 5,785,472 to Smith et al., which is incorporated herein by reference.

The riser pad 50 further includes an upper support surface 54, a riser backstop 57, a pair of leg plates 61 extending downwardly from the upper support surface 54, a correspondingly aligned substantially centrally located mounting hole 66, and optional holes 68. The pair of leg plates 61 further includes lobes 73 that may be used for positioning the riser pad 50 in a storage position. The use and positioning of the riser pad 50 is discussed below in conjunction with the remaining figures.

Figure 3:
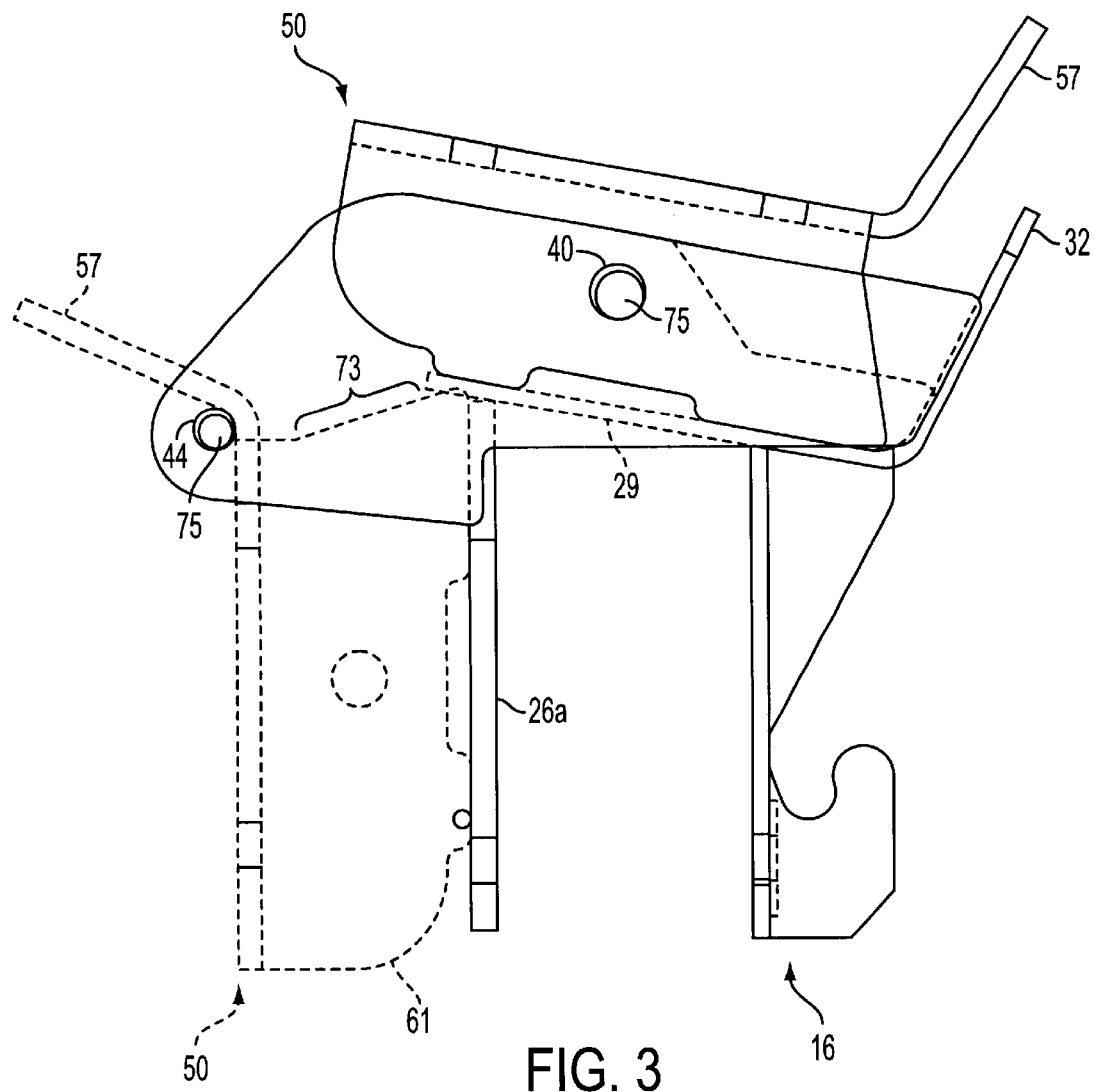
FIG. 3 shows a bottom bracket member and a riser pad of the bracket assembly.

FIG. 3 shows the bottom bracket member 16 and the riser pad 50 in use. In order to accommodate grain headers of various common types, the riser pad 50 may be in either a working position (solid lines) or a storage position (dashed lines).

In the storage position, headers having legs or feet may be accommodated by the bottom bracket member 16 alone, with the legs or feet of the header (not shown) being placed on the top support surface 29 of the bottom bracket member 16. The riser pad 50 is placed in the storage position denoted by the dashed lines when not needed, as in this case. In the storage position, a pin 75 is placed in the correspondingly aligned storage position holes 44 in the pair of side plates 35. The pin 75 may be any type of general purpose pin, including pins having attachments for holding the pin 75 in place. The riser pad 50 is then dropped down between the pin 75 and the side portion 26a of the bottom bracket member 16. The riser pad 50 is held in this position by a gravitational force, with the pair of leg plates 61 contacting the side portion 26a. The lobes 73 of the pair of leg plates 61 may contact the side portion 26a, and may further hold the riser pad 50 in position.

In the working position, headers having only a backbone or main tube for support may be accommodated by the bottom bracket member 16 in combination with the riser pad 50. The riser pad 50 is placed in the working position denoted in FIG. 3 by the solid lines. The pin 75 is placed in the correspondingly aligned working position holes 40 in the bottom bracket member 16, with the pin 75 also passing through the correspondingly aligned mounting holes 66 of the riser pad 50. The pin 75 therefore holds the riser pad 50 in the working position. The header may then rest on the upper support surface 54 of the riser pad 50, with the riser pad 50 resting on the top support surface 29 of the bottom bracket member 16. Due to the slope of the top support surface 29, the upper support surface 54 of the riser pad 50 also slopes downwardly toward the bottom bracket backstop 32, with this slope in combination with the riser backstop 57 serving to hold in position any object placed upon the riser pad 50. In the working position, the riser backstop 57 is adjacent to and similar in angle to the bottom bracket backstop 32.

Figure 4:
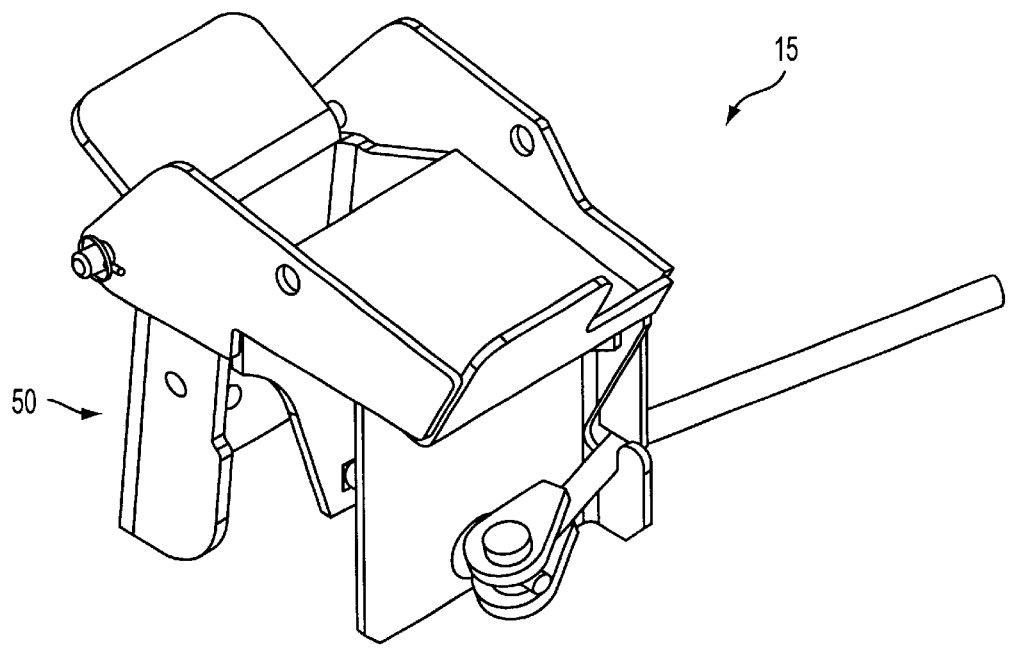
FIG. 4 shows an outer view of the bracket assembly with the riser pad in a storage position.

FIG. 4 shows an outer view of the bracket assembly 15 with the riser pad 50 in the storage position (outer is in reference to an outer edge of the carriage 10 when the bracket assembly 15 is fastened thereto).

Figure 5:
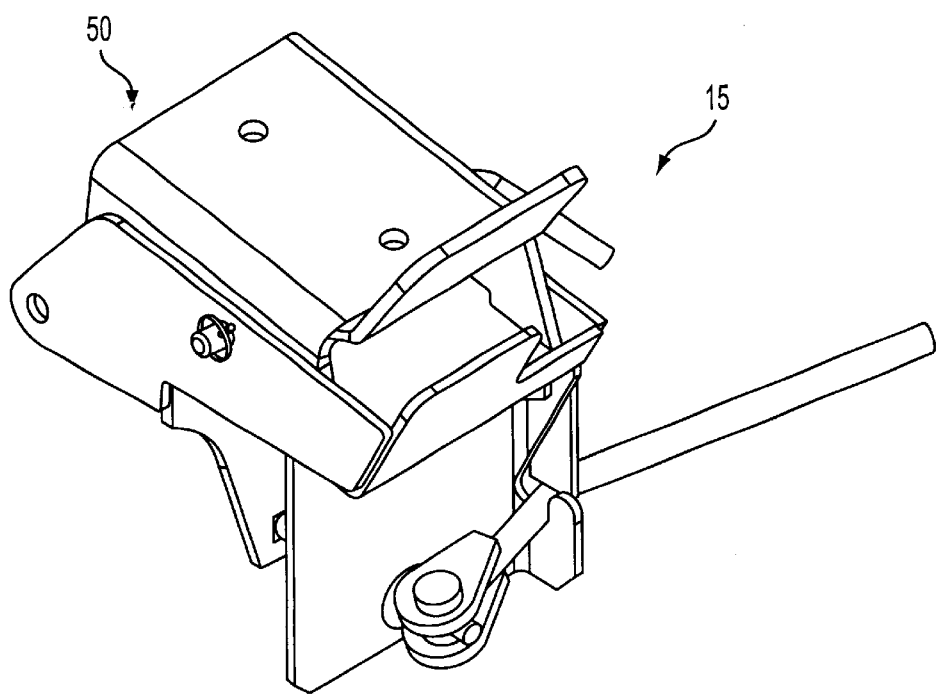
FIG. 5 shows an outer view of the bracket assembly with the riser pad in a working position.

FIG. 5 shows an outer view of the bracket assembly 15 with the riser pad 50 in the working position.

Figure 6:
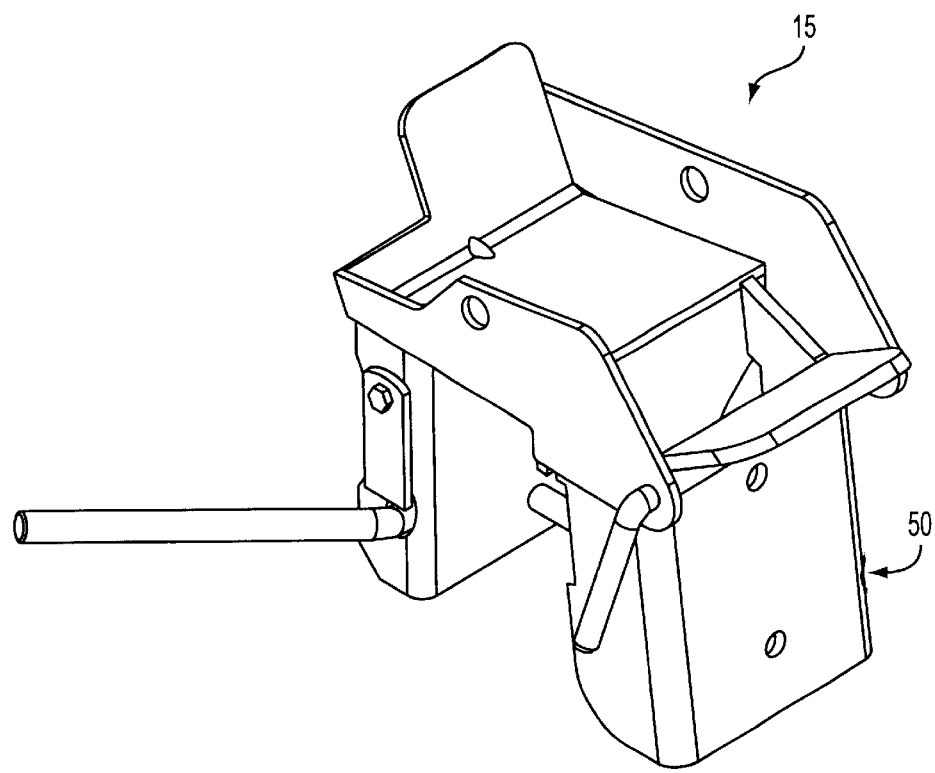
FIG. 6 shows an inner view of the bracket assembly with the riser pad in the storage position.

FIG. 6 shows an inner view of the bracket assembly 15 with the riser pad 50 in the storage position (inner is in reference to an inner region of the frame 12 of the carriage 10 when the bracket assembly 15 is fastened thereto).

Figure 7:
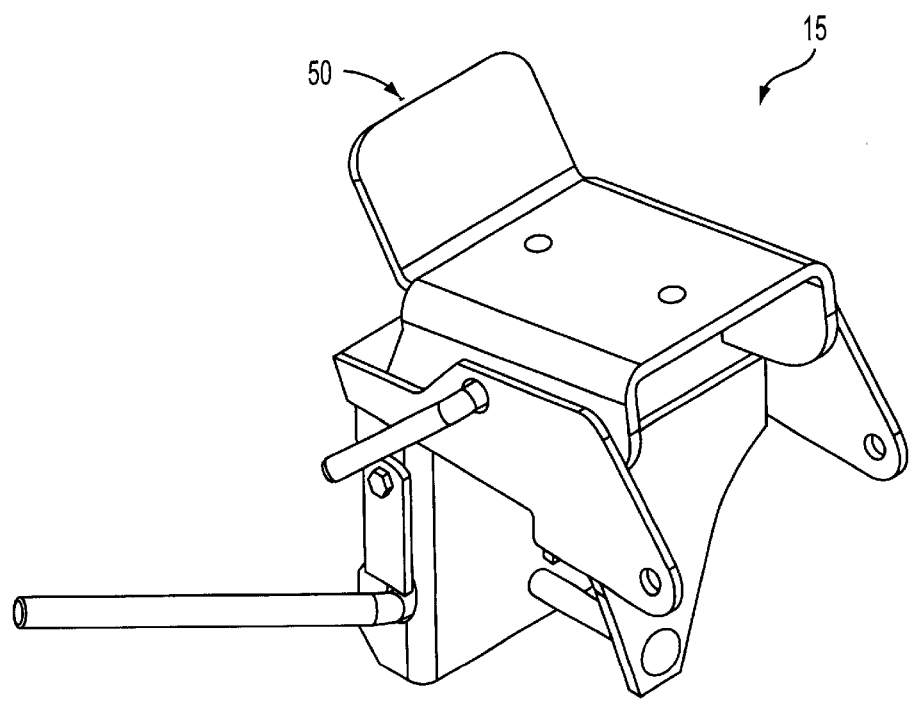
FIG. 7 shows an inner view of the bracket assembly with the riser pad in the working position.

FIG. 7 shows an inner view of the bracket assembly 15 with the riser pad 50 in the working position.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A header transport lower rest bracket assembly for a header transport carriage having a frame, comprising a bottom bracket member capable of being movably clamped to said frame, said bottom bracket member having side portions and a top support surface, said top support surface having a bottom bracket backstop projecting from said top support surface at an angle from vertical, and a pair of side plates on each end of said bottom bracket member and transverse to a frame member on which said bottom bracket member is clamped, each of the side plates having a correspondingly aligned working position hole located in a central region and a correspondingly aligned storage position hole located in an end region opposite said bottom bracket backstop;

a riser pad having an upper support surface, a riser backstop projecting from said upper support surface at an angle from vertical, and a pair of leg plates extending downwardly from said upper support surface, each of said leg plates having a correspondingly aligned substantially centrally located mounting hole and a lobe extending past said upper support surface adjacent said riser backstop; and a pin for retaining said riser pad in either a working position or a storage position;

wherein said riser pad in a working position sets on said top support surface of said bottom bracket member with said riser backstop being positioned adjacent said bottom bracket backstop, said riser pad being held in place by said pin extending through said working position holes in said bottom bracket member and also through said mounting holes of said riser pad, and wherein said riser pad in a storage position is suspended between said pin and said bottom bracket member, with said pin residing in said storage position holes in said pair of side plates of said bottom bracket member and said riser backstop resting against said pin, with said pair of leg plates of said riser pad resting against a side portion of said bracket opposite said bottom bracket backstop.

2. The header transport lower rest bracket assembly of claim 1, wherein said riser pad is positioned as needed to accommodate a header.

3. The header transport lower rest bracket assembly of claim 1, wherein said bracket assembly accommodates a corn header.

4. The header transport lower rest bracket assembly of claim 1, wherein said bracket assembly accommodates a grain header.

5. The header transport lower rest bracket assembly of claim 1, wherein said riser pad is trapped in said storage position by a gravitational force.

6. The header transport lower rest bracket assembly of claim 1, wherein said riser pad may be easily released from said storage position by pressing a lower end of said riser pad against said bottom bracket member.

7. The header transport lower rest bracket assembly of claim 1, wherein said pin may be inserted and removed from said working position holes and said storage position holes in order to move said riser pad between said storage position and said working position.

8. The header transport lower rest bracket assembly of claim 1, wherein said top support surface of said bottom bracket member overhangs a side portion opposite said bottom bracket backstop.

9. The header transport lower rest bracket assembly of claim 1, wherein said top support surface of said bottom bracket member slants downwardly toward said bottom bracket backstop.

10. A method of operating a header transport lower rest bracket assembly for a header transport carriage having a frame, the header transport lower rest bracket assembly having

- a bottom bracket member capable of being movably clamped to the frame, the bottom bracket member having side portions and a top support surface, the top support surface having a bottom bracket backstop projecting from the top support surface at an angle from vertical, and a pair of side plates on each end of the bottom bracket member and transverse to a frame member on which the bottom bracket member is clamped, each of the side plates having a correspondingly aligned working position hole located in a central region and a correspondingly aligned storage position hole located in an end region opposite the bottom bracket backstop;
- a riser pad having an upper support surface, a riser backstop projecting from the upper support surface at an angle from vertical, and a pair of leg plates extending downwardly from the upper support surface, each of the leg plates having a correspondingly aligned substantially centrally located mounting hole and a lobe extending past the upper support surface adjacent the riser backstop; and
- a pin for retaining the riser pad in either a working position or a storage position,
- said method comprising the step of moving the riser pad between the working position and the storage position, wherein the riser pad in the working position sets on the top support surface of the bottom bracket member with the riser backstop being positioned adjacent the bottom bracket backstop, the riser pad being held in place by the pin extending through the working position holes in the bottom bracket member and also through the mounting holes of the riser pad, and wherein the riser pad in the storage position is suspended between the pin and the bottom bracket member, with the pin residing in the storage position holes in the pair of side plates of the bottom bracket member and the riser backstop resting against the pin, with the pair of leg plates of the riser pad resting against a side portion of the bracket opposite the bottom bracket backstop.

11. A method of operating a header transport lower rest bracket assembly according to claim 10 wherein said moving step includes moving the pin between the working position and storage position holes.

* * * * *